UNITED STATES PATENT OFFICE.

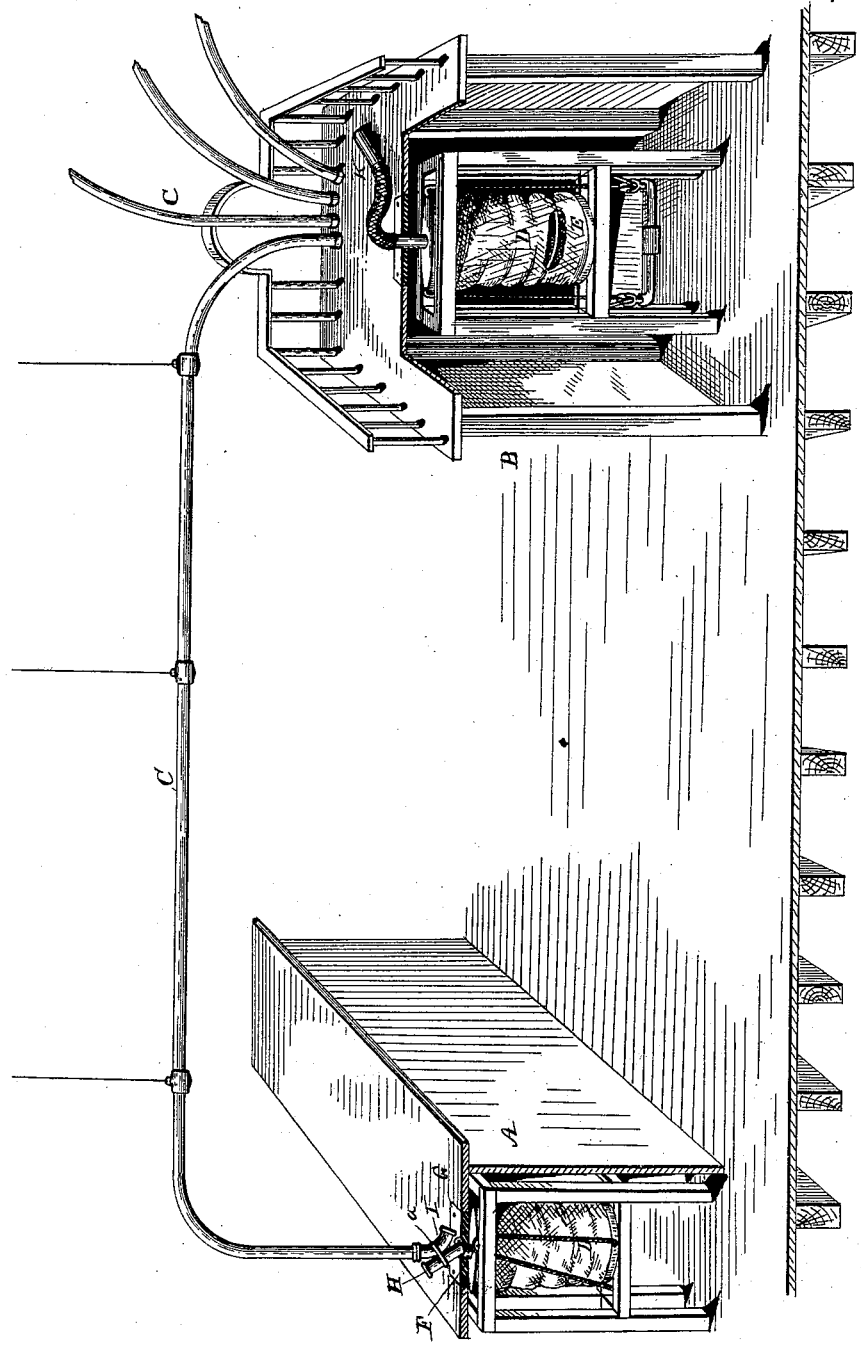

WILBUR G. DAVIS, OF CAMBRIDGE, ASSIGNOR OF ONE-HALF TO WM. M. HINMAN, OF BOSTON, MASSACHUSETTS.

PNEUMATIC CASH-CARRIER.

SPECIFICATION forming part of Letters Patent No. 333,113, dated December 29, 1885.

Application filed May 15, 1885. Serial No. 165,558. (No model.)

*To all whom it may concern:*

Be it known that I, WILBUR G. DAVIS, a citizen of the United States, residing at Cambridge, in the county of Middlesex and State of Massachusetts, have invented certain new and useful Improvements in Pneumatic Cash-Carriers, of which the following is a specification, reference being had therein to the accompanying drawing.

My invention relates to improvements in pneumatic dispatch-tubes or cash-carriers, for use in stores, &c.

The object of my invention is to provide an inexpensive device for use in stores for the conveyance of cash tubes or carriers from the salesman's counter to the cashier's desk, as will more fully appear.

My invention consists of a pneumatic tube leading from the salesman's counter or from various stations in the store or building to the cashier's desk, said tubes being supplied with the requisite amount of air to force the cash-carrier to or from the cashier's desk by means of a bellows or other air-compressing device arranged under the counter or desk, whereby the carrier can be forced in either direction, and only one pipe or tube used for each station.

Other novel features will be described hereinafter, and pointed out in the claims.

In the drawing, A indicates the saleman's counter, B the cashier's desk, and C a glass tube leading from one to the other, said tubes being supported in any convenient manner. The tubes C are by preference made of glass, such as described and claimed by me in Patent No. 297,505, of April 22, 1884.

D is a bellows of any suitable construction, adapted to work in guides, and located under the sales-counter, said bellows being operated by a treadle or other suitable device. The bellows are preferably of cylindrical form, and have a spiral spring, E, located therein to force the lower end of the bellows downward, so that it will be rapidly filled with air, and also serves as a skeleton to support the inside of the bellows. The upper end of the bellows is provided with a nipple, F, which passes through the top of the counter and through a suitable plate, G, to which it is secured in a suitable and substantial manner, said nipple being provided with a suitable valve to prevent the backflow of the air from the tubes.

H is a tube pivoted to the nipple F or to the plate G, so as to communicate with the nipple of the bellows, and also with the end of the tube C, so that the air is forced from the bellows into the tube C, the tube-section being so arranged that it will automatically drop back from the pipe C by its own weight when freed from the hand of the operator.

I is a curved tube, secured to the tube-section H by means of solder or a wire, *a*, or in any other suitable manner, and adapted to move with said tube, so that when the top of tube H is moved over to register with the tube C the tube I will stand at one side of the pipe C; but, as before indicated, when the tubes are freed from the hand of the operator the tube H will drop over so as to shut off the connection between the bellows and the tube C and bring the tube I under the pipe C, so as to be in proper position to allow the carrier to drop onto the counter when returned from the cashier's desk. This is an important feature of my invention, as it leaves nothing to be done by the salesman or the party sending the carrier from the station but to place the carrier in the tube H, move the top of said tube over so as to register with the pipe C, and then operate the bellows to force the carriage to its destination, so that there is no possibility, through neglect or carelessness of the operator, of leaving the tube H in communication with the tube C to obstruct the passage of the return of the carrier. After the carrier has been delivered at the cashier's desk, the tube-section H drops automatically to the position shown in the drawing, bringing the tube-section I to register with the tube C, as before explained, the curved portion of said section I serving to check the speed of the carrier on its return from the cashier's desk and prevent it from striking too hard on the counter. The cashier's desk is also provided with a bellows, D, having a flexible hose and nozzle, K, by which means it can be connected to any one of the series of pipes C, which run from the various stations or counters and terminate at that point, so that the cashier simply places the cash box or carrier into the nozzle K and introduces it into the tube C, applies the air-pressure by means of the bellows, thus forcing the carrier back to the proper station, where it emerges from the bent section I onto the counter or into a receptacle placed there for that purpose.

In devices of this kind it has been the usual custom to employ two tubes leading from the salesman's counter to the cashier's desk, with air-currents driven in opposite directions by fan-blowers and other expensive devices; but by the use of the devices just described I am enabled to construct a cheap and reliable means for the transmission of cash-carriers and other parcels from one point to another. By this arrangement of having an independent current for each tube the operator is enabled to furnish the requisite amount of pressure to carry heavy or light loads at the desired speed, whereas by the use of the air-compressing devices now in use a constant pressure is required that will carry the heaviest loads of any emergency, and necessarily conveying the lesser loads at too great a speed, ofttimes to the destruction of carriers, terminals, and contents.

Having thus described my invention, what I claim, and desire to secure by Letters Patent, is—

1. In cash-carriers for store-service and other purposes, a tube leading from the salesman's counter or other station to the cashier's desk, adapted to be engaged with a bellows at either end, as described, whereby the cash box or carrier is made to travel in either direction toward or from the cashier's desk, as set forth.

2. The counter A, having a bellows, D, located thereunder, provided with a nipple, F, leading through the top of the counter, and the double tubes H and I, adapted to be brought under the tube C, as set forth.

3. The bellows D, having the nipple F and pipe H hinged thereto, in combination with the pipe C, as set forth.

4. In devices for transmitting carriers from the cashier's desk to stations or counters in the store, the bellows D, located under the cashier's desk, provided with a flexible hose and nozzle, K, adapted to receive the cash box or carrier and be inserted into the main tubes or pipes C, as set forth.

In testimony whereof I affix my signature in presence of two witnesses.

WILBUR G. DAVIS.

Witnesses:
N. D. ADAMS,
MARY BARKER.